United States Patent [19]

Sullivan

[11] Patent Number: 4,746,689

[45] Date of Patent: May 24, 1988

[54] METHOD OF MAKING AN ANTI-FUGATIVE ANTI-FOGGING COMPOUND, SAID PRODUCTS AND FILM MADE THEREFROM

[75] Inventor: Carl M. Sullivan, Akron, Ohio

[73] Assignee: The Goodyear Tire & Rubber Company, Akron, Ohio

[21] Appl. No.: 887,481

[22] Filed: Jul. 21, 1986

[51] Int. Cl.$^4$ .............................................. C08K 5/10
[52] U.S. Cl. ...................................... 523/348; 524/109; 524/110; 524/111; 524/308; 524/312; 524/570
[58] Field of Search ............... 524/109, 110, 111, 308, 524/312, 317, 570; 523/348

[56] References Cited

U.S. PATENT DOCUMENTS

| | | | |
|---|---|---|---|
| 3,048,263 | 8/1962 | Sacks et al. | 524/312 |
| 4,362,835 | 12/1982 | Phillips, Jr. | 524/317 |
| 4,425,268 | 1/1984 | Cooper | 524/317 |
| 4,542,188 | 9/1985 | Van der Heijden | 524/528 |

Primary Examiner—Joseph L. Schofer
Assistant Examiner—N. Sarofim
Attorney, Agent, or Firm—J. D. Wolfe; M. R. Dion, Sr.

[57] ABSTRACT

A method of forming a composition that can be formed into a film exhibiting freedom from loss of tack and anti-fogging properties on prolonged storage in a freezer comprising dry blending linear low density polyethylene (LLDPE) with preferably at least a pair of tack agents and a pair of anti-fog agents, extruding the dry blend as an elongated member, chopping said member to particulates and extruding said particulates to form a film.

4 Claims, 1 Drawing Sheet

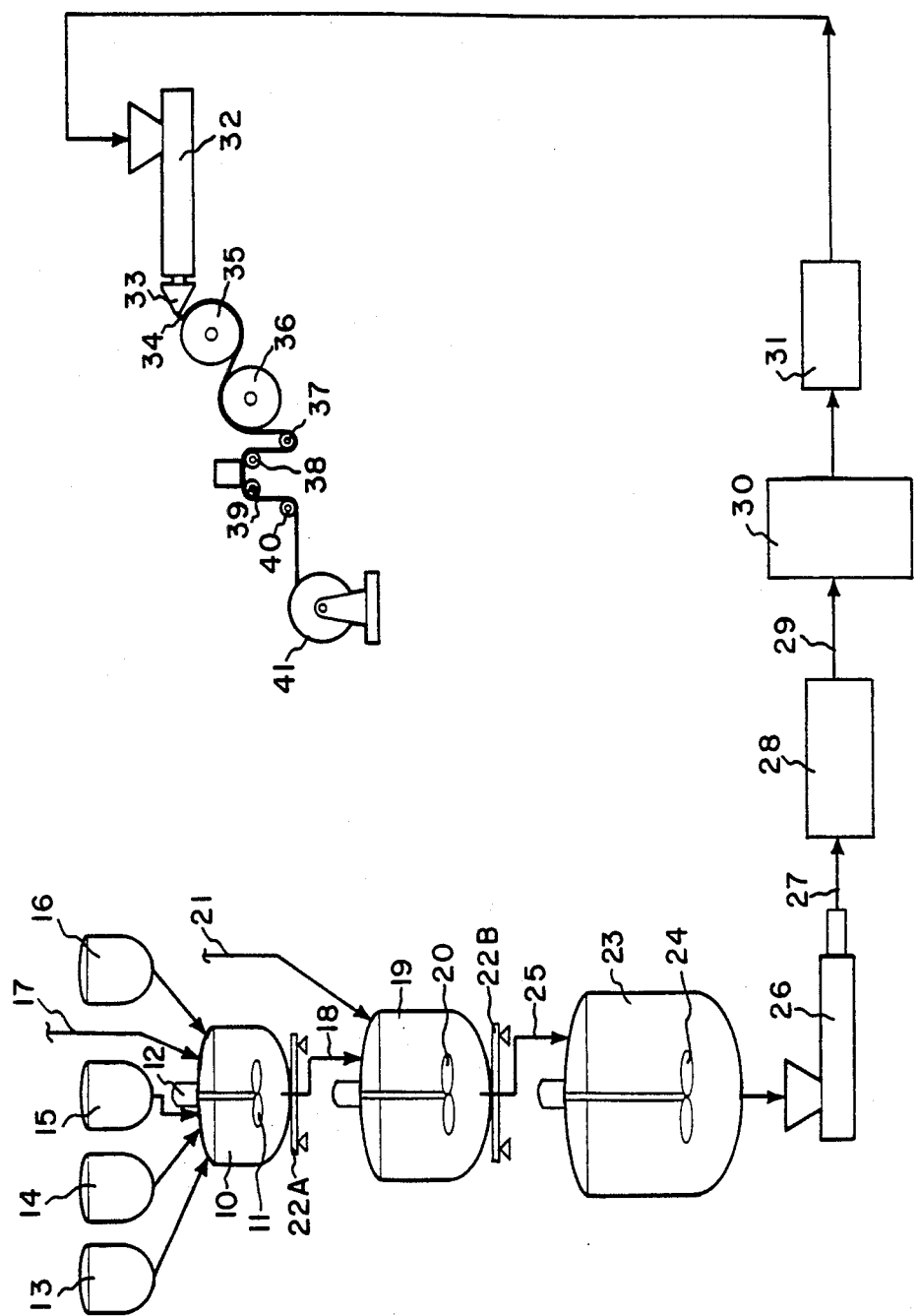

METHOD OF MAKING AN ANTI-FUGATIVE ANTI-FOGGING COMPOUND, SAID PRODUCTS AND FILM MADE THEREFROM

TECHNICAL FIELD

This invention relates to a compounded linear low density polyethylene that produces film characterized by excellent anti-fugative anti-fogging and tack properties and to the method of making same.

PRIOR ART

Polyolefin films such as polyvinyl chloride are a major industrial product. Also, polyethylene film has achieved a considerable degree of commercial success. Although use of these films to wrap meats is widely utilized, the fogging of the wrapped film on the meat package and loss of tack has presented a problem. For instance, the 1962 U.S. Pat. No. 3,048,263 assigned to Union Carbide Corporation taught the use of a host of anti-fogging agents to solve this problem.

To appearances it would appear that the above patent should have solved the anti-fogging problem with polyethylene film. Unfortunately, the linear low density polyethylene films even when compounded according to the teachings of U.S. Pat. No. 3,048,263 exhibited sprue, wash off or fugative anti-fogging properties and loss of tack due to moisture effects. Thus, a linear low density film although having strength, cost and yield advantages relative to the other polyethylenes was handicapped by exhibiting sprue, wash off or fugative anti-fogging tendencies and the package coming unwrapped in the freezer due to combined moisture effects on the tack. Hence these effects and handicaps demonstrated that linear low density polyethylene acted differently as a film. U.S. Pat. No. 4,362,835 to Martin A Phillips demonstrates the difference in processing characteristics of linear low density polyethylene relative to other polyethylenes. Likewise, those expert in this art as late as 1985 as demonstrated by the patentees of U.S. Pat. Nos. 4,542,188 or 4,425,268, still taught the prevailing view and the thrust of thinking was that linear low density polyethylene needed to be blended with a second polymer such as the other polyethylenes or ethylene/vinyl acetate polymer for the tackifying agents such as the polyisobutylene resins or atactic polypropylene to be used to get the desired cling or tack.

THE INVENTION

I have discovered that the above disadvantages and handicaps associated with linear low density polyethylene arises from lack of proper mixing. Even through U.S. Pat. No. 3,048,263 teaches homogeneously mixing the anti-fogging agents, this does not yield linear low density polyethylene film free of fugative anti-fogging and tack properties.

I have discovered that linear low density polyethylene can be compounded by a unique mixing procedure to give a composition which can be formed into a film that exhibits excellent non-fugative anti-fogging and tack properties. These linear low density polyethylene compositions are prepared by dry blending under a high shear agitation the tackifier, the anti-fogging agents and at least a significant part to all of the linear low density polyethylene, to form a dry mixture and ultimately forming a complete dry mixture, extruding the dry mixture through a strand die, chopping said strand to yield particulates, extruding the particulates to form a film.

The linear low density polyethylene useful in this invention is well known and readily available from a number of commercial sources under the generic designation LLDPE. I have discovered that the properties of fugative fogging and fugative tack experienced by linear low density polyethylene (LLDPE) film is due to inadequate mixing of the tackifiers, surfactant and other compounding ingredients and that if these compounding ingredients are properly mixed in the linear low density polyethylene film produced therefrom is more resistant to loss of tack and fogging.

Any of the more common resinous tackifiers may be used but especially preferred for the LLDPE films they produce are the tackifiers, polybutenes and atactic polypropylenes. These tackifiers are preferably used in pairs or blends such as a blend of high molecular weight polyisobutylene and low molecular weight polyisobutylene, a blend of polybutenes and atactic polypropylene or a blend of atactic polypropylene and polybutene 1.

Likewise, the usual and well known polyethylene anti-fogging agents may be used but again the use of two anti-fogging agents is highly desirable for better results. These preferred pairs of agents are glycerol mono-oleate and ethoxylated alcohols of two to eight carbon atoms, glycerol mono-oleate and sorbitan mono-laurate.

The nature of this invention, its advantages and how to practice it can more readily be understood by reference to the drawing where the figure is a schematic flow chart showing one embodiment of the arrangement of the mixing and film forming equipment. Numeral 10 of the drawing designates a high speed mixer having the paddle mixer 11 driven by motor 12 to develop high shear. A series of storage tanks are positioned above the mixer 10 so the liquid or molten contents of these storage tanks can be fed by gravity to the mixer. Alternately the feed could be done by pumps or other well known apparatus. The mixer 11 preferably is mounted on scales 22A to weigh in the ingredients to be mixed. The ingredients from the storage tanks 13–16 which may have heaters are fed to the mixer by the lines shown by proper operation of the values therein (not shown). The linear low density polyethylene is fed to the mixer 10 via line 17 as pellets or granulates. The dry mixture from mixer 10 drops via line 18 to auxiliary mixer or blender 19 equipped with a high speed paddle stirrer 20. Also additional linear low density polyethylene can be fed to the blender 19 via line 21. This blender 19 is likewise preferably mounted on scales 22B to facilitate properly controlling the blending of the correct amount of ingredients. The mixture from blender 19 is dropped to final dry blender 23 having a high shear stirrer 24 therein via line 25. The final dry blend is fed to an extruder 26 to mill the dry blend under fluid or melt conditions until it passes from the die of the extruder as a ribbon or strand 27. The strands or ribbons pass through a cooling zone 28 such as an air blast or water tank. The coated strand 29 is then chopped into particulates or pellets in chopping station 30. Optionally the particulates drop into a blending storage or surge tank 31 to await being charged to a film forming extruder 32 to be again melted and mixed. The material from extruder head 33 forms a film by well known means such as the well known bubble apparatus, alternately, the material is extruded as a film 34. The film 34 from the extruder head 33 passes around a pair of chiller rolls 35 and 36 and gauge rolls 37–40 and then is wrapped on winding roll 41.

The nature and practice of this invention will be further illustrated by the following representative and exemplary examples where all parts and percentages are by weight unless further exemplified.

EXAMPLE 1

A linear low density polyethylene, 100 parts either as granulated powder or pellets was blended in a Henschel mixer at 500 RPM with 1 to 2 parts of high molecular weight about 10,000 to 12,000 polyisobutylene, and 0.25 parts of low molecular weight about 8,000 to 10,000 polyisobutylene. Then 0.4 to 2.0 parts of glycerol mono-oleate and 0.25 to 0.75 parts of sorbitan mono-laurate was added to the mixer and when the liquid ingredients had mixed therein with the (LLDPE), the speed of the mixer was slowly increased to about 5000 RPM and the mixing continued until the mixture temperature had risen to about 90° to 95° C. but less than that temperature to cause substantial melting of the LLDPE to give a dry mixture.

In some operations, only part of the LLDPE is mixed at first, i.e., about 10 to 60% and the dry mixture is given a second mix in a second Henschel mixer where this is desired and the rest of the LLDPE added. Usually the second or third blend in the mixer gives better assurance of uniform mixing. The dry mixture from the last Henschel mixer was dropped into the food inlet of an extruder fitted with a strand or ribbon die and extruded as a ribbon. The ribbon was cooled and chopped into pellets or chips, preferably 0.3 to 0.6 cm, in length. The chips were fed to a film extruder having double chiller rolls for chilling the extruded film. Then the chilled film is rolled on a windup roll.

Film samples were used to run water wash off or anti-fog and tack tests. The film had excellent initial tack and anti-fog characteristics and these properties were still satisfactory after days in a freezer at 0°–8° C. when wrapped around a styrene tray containing a fresh meat.

The film made in Example 1 had excellent initial tack and the tack remained on storage in the freezer.

Also, the film was tested for the anti-fog and condensate appearance test by the following test.

Cast Films Test Method For Anti-Fog and Condensate Appearance Test

Equipment
a. Refrigerated case (0° to 4° C.), or standard refrigerator
b. Stop watch or timer
c. Paper towels (Nibroc, Kraftex, Ft Howard or similar 9½×10½ single sheet folded towel)
d. No 2 packaging trays, pulp board or foam.
Test Procedure
a. Cut a pad of 4 towels in half approximately 5½"×4½" and stack together giving the thickness of 8 towels. It is not necessary to completely cover the tray bottom.
b. Mark identification of film sample being checked on the pad of towels.
c. Thoroughly saturate the pad of towels with cold water squeezing out excess water by pressing with flat of hand against side of sink, so that towels are not dripping wet. When so done, the pad of towels will contain approximately 40 grams of water.

Use cold water, 4° to 10° C.
d. After placing the towels in the tray, completely overwrap the tray and towels with the sample being checked. Caution should be observed so the film sample does not contact the moist towels during the wrapping procedure.
e. Immediately place the package in the refrigerated case and note the time. Depending on the type of film being tested, the fog in varying degrees, may or may not appear at once.
f. As the fog dissipates and a return to clarity of the film is observed, again note the time. If using a refrigerator, open door to check appearance at 30 sec, 2 min, and at 5 min intervals until any fog formed is dissipated.
g. Age trays for 20 additional minutes after the fog dissipates and evaluate for condensate appearance, and again after two hours. The ratings to be used are:
Heavy—film surface covered with large drops (0.6 cm or more in diameter)
Medium—film surface covered with small drops easily seen (size of BB shot)
Light—Small drops rather difficult to see or cover only a portion of the surface.
Very Light—very difficult to find droplets (approximately the size of a pinpoint)
None—no droplets of water. A layer of water may show on film surface.
h. Check condensate appearance again, after aging overnight (18 to 24 hours total time). Note: In performing this procedure for routine Quality Control checking, the 2 hour check can be eliminated unless more than 30 minutes is required to dissipate fog.

Other dry blends using other anti-fogging agents and tackifiers were made using the procedure of Example 1. For instance one LLDPE composition so made contained 100 parts LLDPE, 1 to 2 parts polybutene, 0.5 to 1.0 part atactic polypropylene, 0.2 to 2.0 glycerol mono-oleate and 0.25 to 0.75 parts of sorbitan mono-oleate. This dry blend was extruded as a ribbon, pelletized and the pellets extruded as a film on a chilled roll equipped film extruder. This film had excellent anti-fog and tack properties after days in a meat freezer.

Another dry blend was made with this recipe, 100 parts LLDPE, 0.5 to 1.0 parts of atactic polypropylene, 0.5 to 2.0 parts of polybutene-1, 0.2 to 2.0 parts of glycerol mono-oleate and 0.5 to 2.0 parts of ethoxylated alcohols. Then this dry blend was passed through an extruder to form ribbons, the ribbon was chopped and extruded as a film. This film had satisfactory anti-fugative, anti-fogging and tack properties.

While certain representative embodiments and details have been shown for the purpose of illustrating the invention, it will be apparent to those skilled in this art that various changes and modifications may be made therein without departing from the scope of the invention.

What is claimed is:
1. A method of compounding linear low density polyethylene (LLDPE) with tackifiers and anti-fogging agents to yield a composition that can be extruded to yield a film having non-fugative anti-fog and tack properties, comprising dry blending under high shear agitation the tackifier, anti-fogging agent and at least a significant part to all of the linear low density polyethylene, if only part of LLDPE added initially, then the rest is added and dry blending is repeated on the total blend to give a dry mixture, passing the dry mixture through an extruder to yield strands, chopping said strands to yield particulates, feeding said particulates to a film extruder to form a film.

2. The method of claim 1 wherein the dry mixture is composed of a blend selected from the following mixtures:
   (a) 100 parts LLDPE and about 0.25 to 0.5 parts low molecular weight polyisobutylene, 1 to 2 parts of high molecular weight polyisobutylene, 0.4 to 2 parts of glycerol mono-oleate and 0.25 to 0.75 parts of sorbitan mono-laurate.
   (b) 100 parts LLDPE, 1 to 2 parts polybutene, 0.5 to 1.0 parts atactic polypropylene, 0.2 to 2.0 parts glycerol mono-oleate and 0.25 to 0.75 parts sorbitan mono-laurate, and
   (c) 100 parts LLDPE, 0.5 to 1.0 parts atactic polypropylene, 0.5 to 2.0 parts polybutene-1, 0.2 to 2.0 parts glycerol mono-oleate and 0.5 to 2.0 parts ethoxylated alcohols.

3. The method of claim 1 wherein for each 100 parts of LLDPE, the tackifying agent comprises 0.25 to 0.5 parts of low molecular weight polyisobutylene, 1 to 2 parts of high molecular weight polyisobutylene, and the anti-fogging agent comprises 0.25 to 0.75 parts of sorbitan mono-laurate and 0.4 to 2 parts of glycerol mono-oleate.

4. The method of claim 1 wherein the tackifying agent comprises a polyisobutylene of 8,000 to 10,000 Staudinder molecular weight together with a polyisobutylene of Staudinder molecular weight of 10,000 to 12,000.

* * * * *